Oct. 16, 1934.    W. T. SMITH    1,977,495
STAVE JOINTING MACHINE
Filed Sept. 6, 1932    6 Sheets-Sheet 1
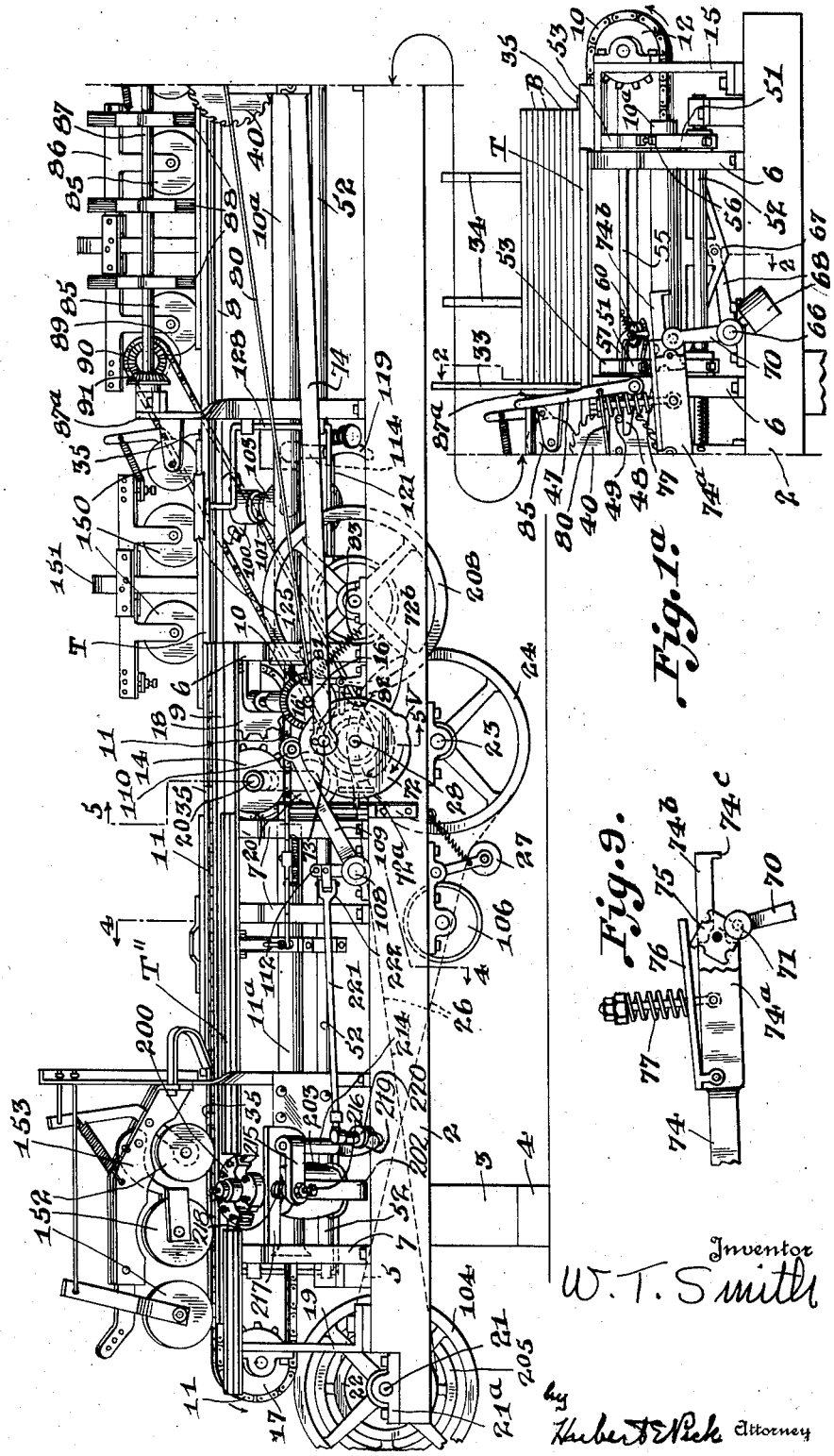

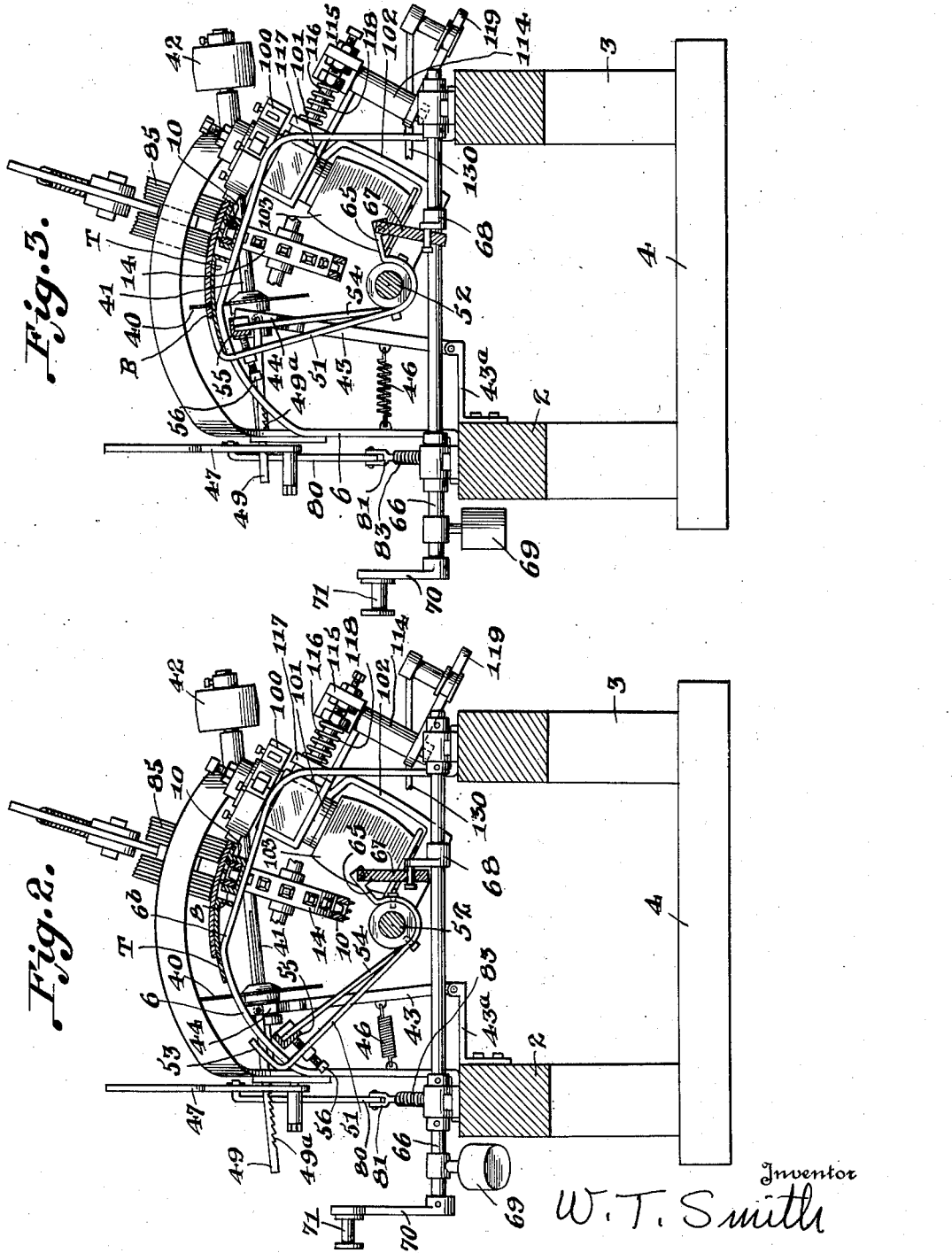

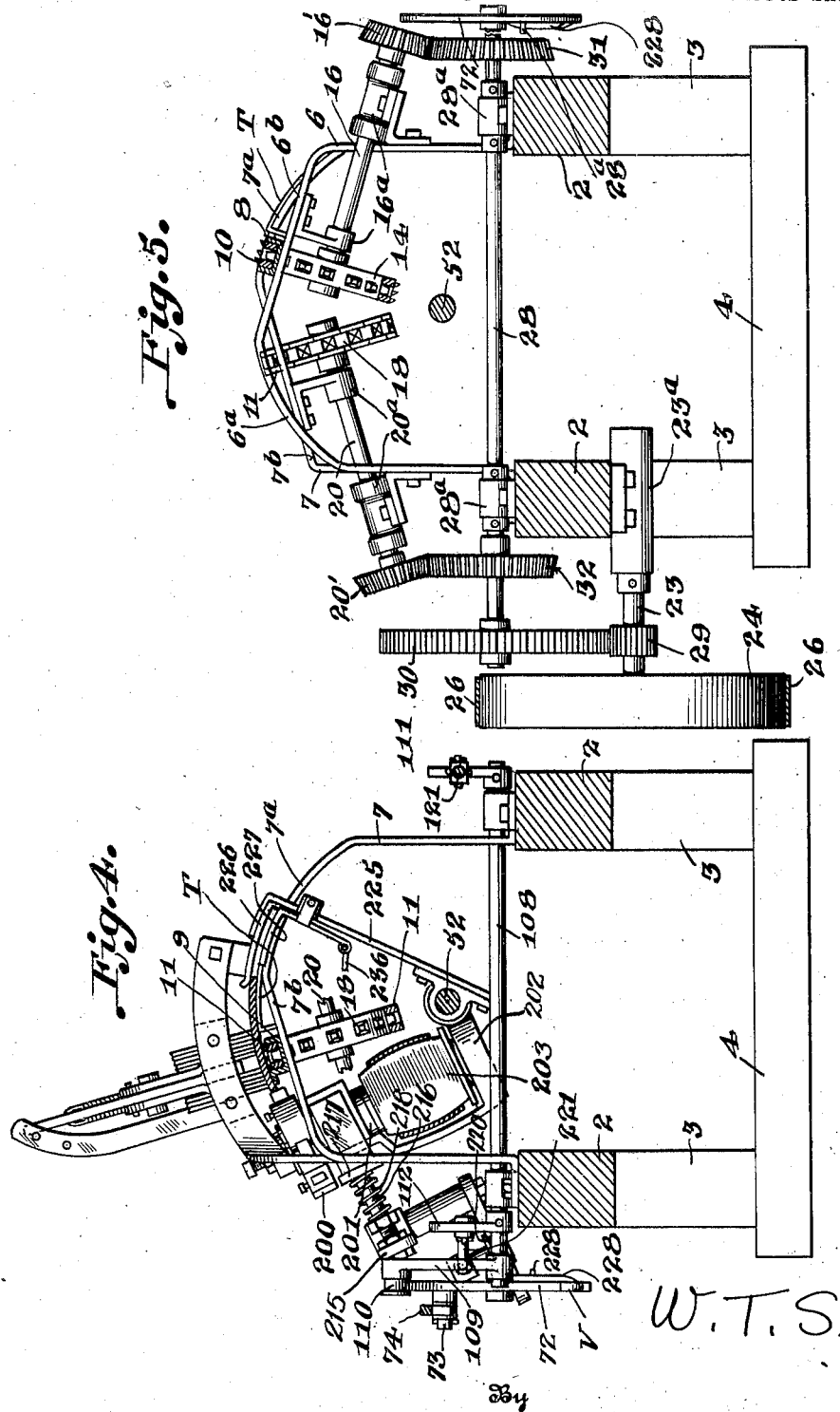

Oct. 16, 1934.　　　　W. T. SMITH　　　　1,977,495
STAVE JOINTING MACHINE
Filed Sept. 6, 1932　　　6 Sheets-Sheet 5
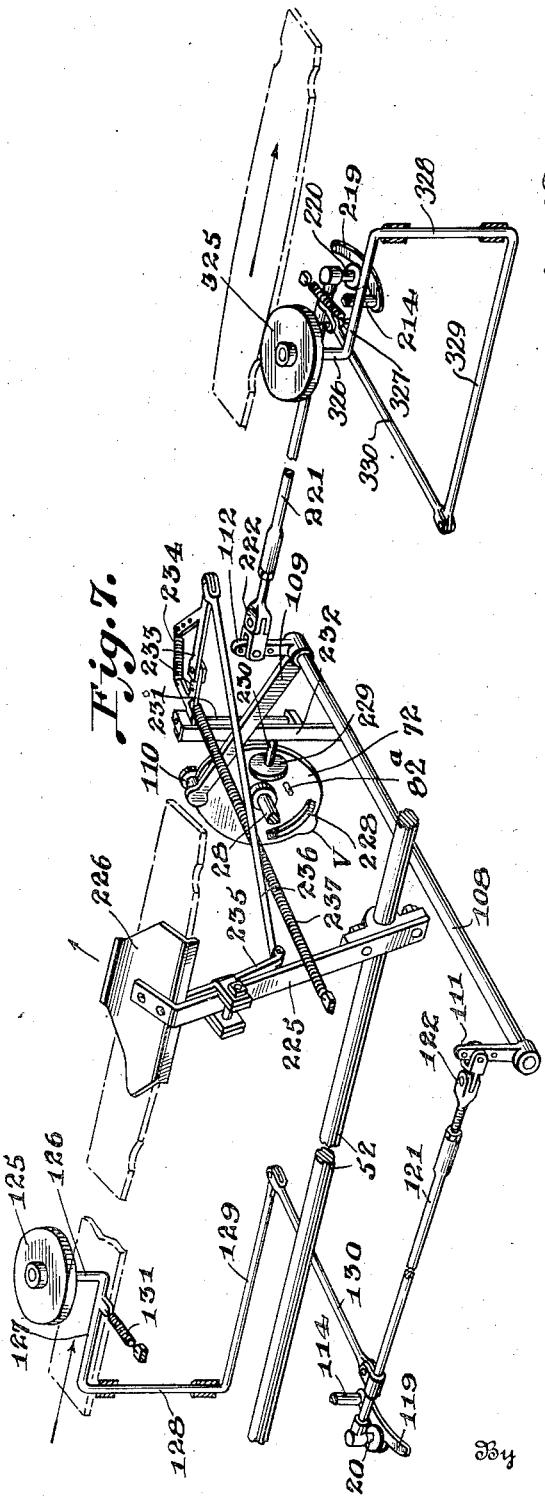
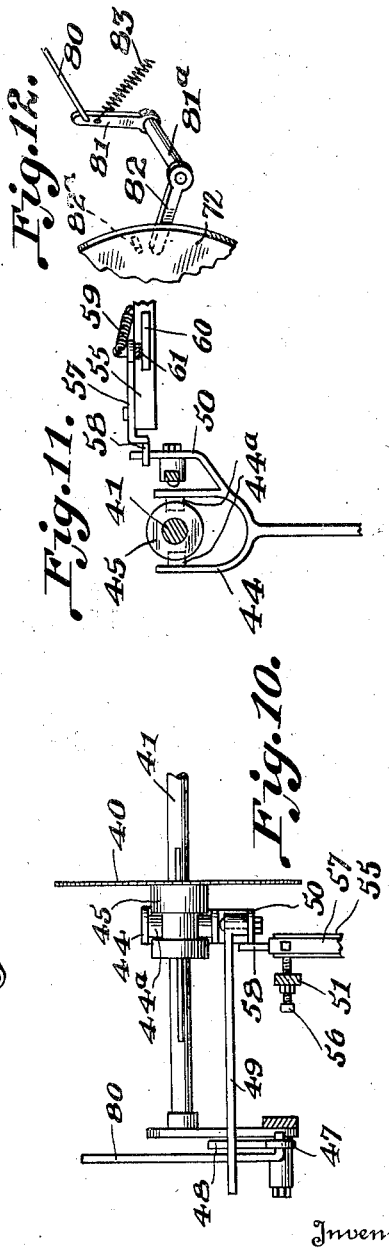
Inventor
W. T. Smith
By
Hubert E. Peck　Attorney

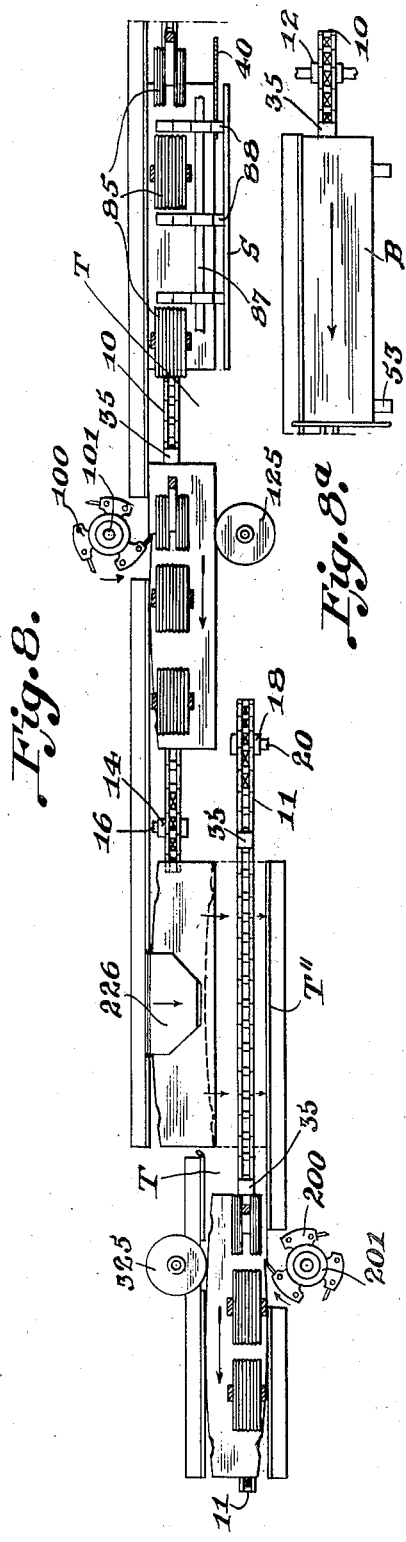
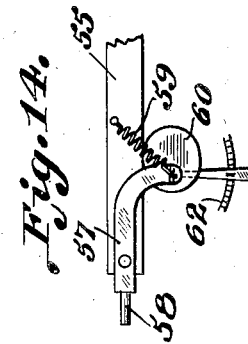
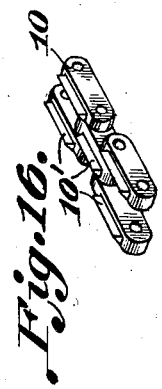
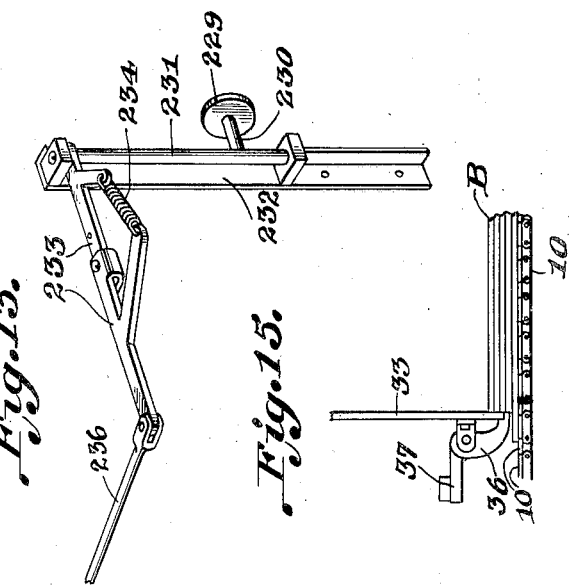

Patented Oct. 16, 1934

1,977,495

UNITED STATES PATENT OFFICE 1,977,495

STAVE JOINTING MACHINE

William T. Smith, New Bern, N. C.

Application September 6, 1932, Serial No. 631,934

21 Claims. (Cl. 147—27)

This invention relates to certain improvements in stave jointing machines; and the nature and objects of the invention will be readily recognized and understood by those skilled in the art to which it relates, in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

My invention presents a machine for automatically longitudinally trimming and jointing barrel and the like staves from suitably formed stave blanks; and a general aim and object of the invention is to provide a design of machine of such type, and an arrangement and cooperative association of mechanisms and elements forming the same, which is mechanically efficient and positive in operation and which will require a minimum of maintenance or upkeep and repairs under the conditions encountered in use; which is fully automatic in operation with a minimum requirement for operator control and adjustments or for manual operations when in use, thus eliminating the necessity for highly skilled and experienced operators; which is capable of relatively high speed operation with a high degree of accuracy and a minimum loss through imperfectly or inaccurately jointed staves; and which is automatically adjustable to trim and joint staves of varying widths without interruption in the operation of the machine and its high speed production of accurately jointed staves, to thereby do away with the requirement for stave blank selection by the operator prior to supplying the stave blanks to the machine for jointing.

A feature and general characteristic of the invention resides in an organization of associated and synchronized mechanisms by which suitably preliminarily formed and cut to length stave blanks are fed successively, one by one, from a magazine and automatically trimmed longitudinally to remove from each stave blank an edge strip or splint of a predetermined width, irrespective of the width of each blank as it is fed from the magazine, and then by which such trimmed blanks, without interruption to their rate of progress through the machine, are successively jointed to form the desired opposite longitudinal edge bilge thereon.

Another general feature of the invention is found in the provision for automatically forming the bilge on the opposite longitudinal edges of each trimmed stave blank as it passes through the machine, by means of rotary cutters which are automatically adjusted and controlled in accordance with and by the width of each stave blank as it passes through the machine, so that the cutters form a bilge of the proper radius of bilge curvature for each stave width; and a further feature resides in the formation of the bilge to first one longitudinal edge of the stave and after the completion of the bilging of one edge, the formation of the bilge to the opposite edge of the blank as a separate operation, all without arresting the progress of the stave blanks through, or stopping the operation of, a machine of the invention.

A further feature of the invention is presented by an arrangement by which each stave blank after the bilging of one edge thereof, is transferred and repositioned with respect to the rotary cutting means for bilging the opposite edge of the stave blank to complete the jointing operation.

Another feature of the invention resides in the provision for automatically controlling and causing the rotary cutters for separately bilging the opposite longitudinal edges of each stave blank, to form vent notches or cut-outs at the proper points in the edges of each stave blank, simultaneously with and as such cutters form the bilge on each edge of a blank.

The invention is further characterized and featured by an arrangement and relative association and timing of the several means and mechanisms forming a jointing machine, by which the several operations are simultaneously performed on different staves, respectively, as a plurality of stave blanks are continuously progressing successively through the machine, so that relatively high speed production of trimmed and jointed staves results.

With the foregoing general features, characteristics and results in view, as well as certain others which will be apparent from the explanation to follow, the invention consists in certain novel features in construction, and in combinations and arrangements of elements and mechanisms, all as will be more fully and particularly referred to and specified hereinafter.

Referring to the accompanying drawings, in which similar reference characters refer to corresponding parts throughout the several figures thereof:

Figs. 1–1a are view in side elevation of a stave jointing machine embodying my invention, the magazine or intake end of the machine and the automatic trimming saw adjusting and controlling mechanism being shown in Fig. 1a.

Fig. 2 is a view in transverse section through the machine, taken as on the line 2—2 of Fig. 1a and showing the stave blank feeler mechanism and trimmer saw controlled thereby in their outward normally inoperative position; one of the rotary jointing or bilging cutters and a portion of its operating and controlling mechanism also being shown.

Fig. 3 is a view similar to Fig. 2 but showing the feeler mechanism and trimmer saw in their inwardly swung operative position engaging a stave blank with the trimmer saw adjusted to position for trimming a longitudinal edge of the blank.

Fig. 4 is a vertical transverse sectional view through the machine taken as on the line 4—4, of Fig. 1, and showing the mounting and arrangement of the stave transfer mechanism, the second rotary jointing cutter with a portion of its controlling mechanism, and the main operating cam of the machine.

Fig. 5 is a vertical transverse section through the machine, taken as on the line 5—5, of Fig. 1, with portions of the machine removed, to particularly show the main drive for the machine and the stave blank feeding and conveying chains.

Fig. 7 is a perspective view, more or less diagrammatic, of the arrangement and association of the main cam of the machine with the rotary cutter controlling and adjusting mechanism and stave transfer mechanism actuated and controlled thereby; stave blanks being schematically indicated in relative operative positions with respect to such mechanisms as the blanks progress through the machine.

Figure 6:
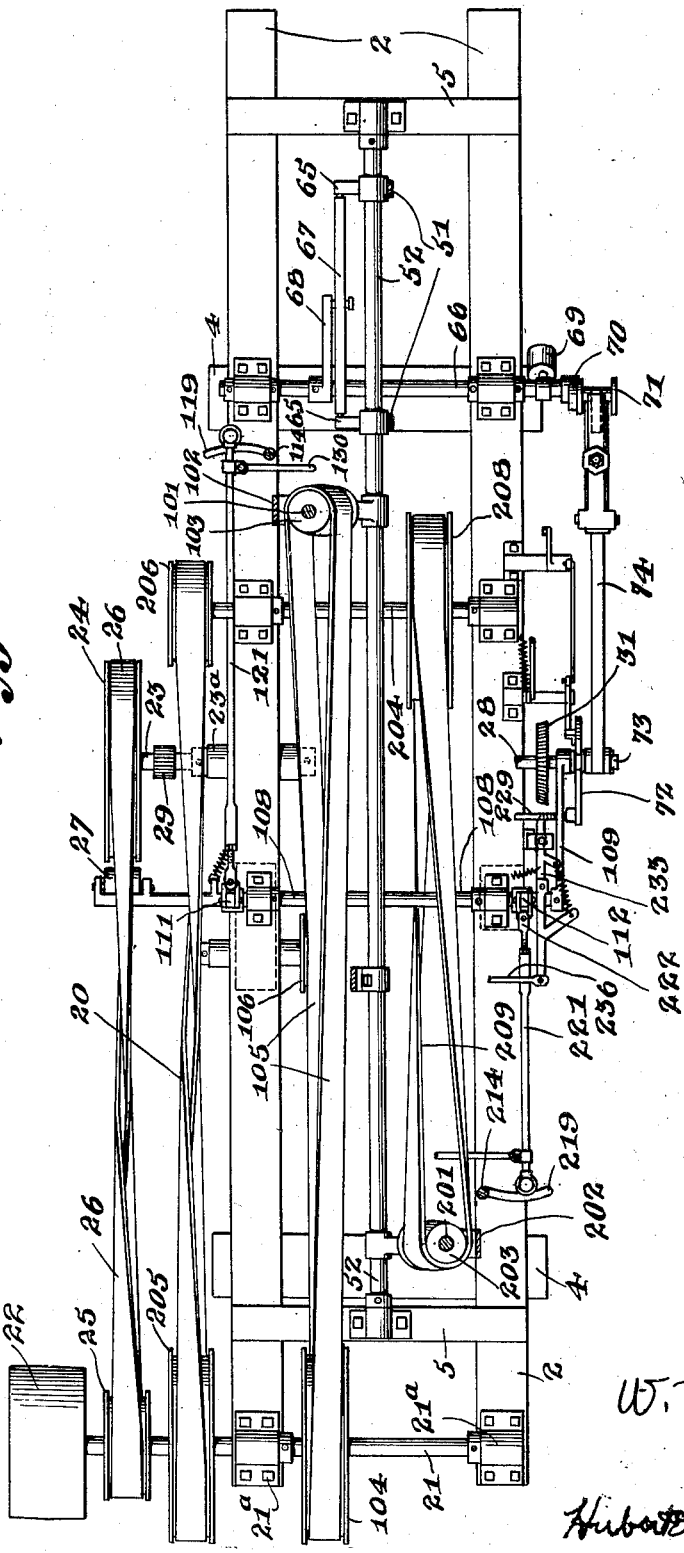
Fig. 6 is a top plan view of the driving and belt transmission mechanism and arrangement of the machine of Fig. 1, for operating and controlling the various mechanisms; showing particularly the rotary jointing cutters and the main operating cam with portions of the mechanisms actuated thereby.

Figs. 8-8a are a top plan view, more or less diagrammatic, showing the relative position of the trimmer saw, rotary cutters, stave blank transfer, and a plurality of stave blanks, at one point in the progress of the blanks through the machine; the position of the main controlling cam for such relative positions of the mechanisms actuated thereby and the stave blank positions being diagrammatically indicated.

Fig. 9 is a detail fragmentary view of the cam actuated connecting rod in operative relation with the operating crank of the stave blank feeler and trimmer saw adjusting mechanism, parts being broken away to show the arrangement for movement of the connecting rod relative to the crank.

Fig. 10 is a fragmentary view in top plan of the stave blank trimmer saw and the adjacent portion of the feeler frame in operative adjusting engagement therewith, a portion of the lock and release mechanism for the saw also being shown.

Fig. 11 is a detail fragmentary view showing the saw actuating yoke mechanism in operative engagement with the feeler frame for actuation to adjust the position of the saw.

Fig. 12 is a detail fragmentary perspective view of a portion of the main cam with the trip for actuating the saw lock release mechanism, the trip engaged finger of which mechanism is also shown.

Fig. 13 is a detail perspective view of the main cam operated mechanism for actuating the stave blank transfer arm and carrier.

Fig. 14 is a detail view of the mechanism for manually adjusting the position of the saw engaging member on the stave blank feeler frame.

Fig. 15 is a detail view in side elevation of the guard for insuring feed of one stave blank at a time from a supply of blanks in the magazine.

Fig. 16 is a detail perspective view of the construction of the links forming the stave blank conveying chains of the machine.

One of a variety of possible mechanical expressions of which my invention is capable, has been selected for explanatory purposes and is illustrated in the accompanying drawings described hereinafter, to enable those skilled in the art to understand the principles and the several features which my invention embodies. The illustrated example is, however, not to be considered as a limitation in all and every respect, as obviously the broad principles and features involved can be mechanically expressed and carried out in other ways and by various other mechanical expedients, and my invention contemplates and includes all such various other mechanical expressions of which the invention may be capable.

For example, in the present instance, the jointing machine of my invention is mounted and supported on a main frame, bed, or the like supporting base or structure which includes (see Figs. 1, 2, and 6 of the drawings in particular), the spaced, longitudinal beams or bearers 2, supported adjacent their opposite ends, respectively, by the columns or posts 3 mounted on the cross members 4 at their lower ends; the longitudinal frame beams 2 being cross braced and joined together adjacent their ends by the transverse beams or cross members 5, respectively, (see Fig. 6). The invention is, of course, in no sense limited to any particular supporting frame or base structure, which merely forms the medium upon which the mechanisms making up the machine are mounted in operative association, the supporting frame structure, in the present instance, defining by its length, the path along which the stave blanks progress from one end of the machine, the supply or intake end, to the opposite end of the machine, the discharge end, from which the completely jointed staves are discharged.

In the particular arrangement and design of the machine of the present example, an elevated floor, platform, or table T is provided on and along which the stave blanks are moved and conveyed, which floor or platform extends substantially the length of the supporting bed or base, from end to end thereof, and includes the upwardly arched, transverse support members 6 and 7, referring now to Figs. 1-1a, 2, and 4, in particular, spaced along the supporting bed and extending transversely across and between the longitudinal beams 2 of the bed or base. Each of the upwardly arched, transverse support members 6 and 7, has the opposite vertical legs thereof secured at their lower ends to the longitudinal beams 2, respectively, while the transverse portion 6a or 7a connecting the vertical legs is curved or arched upwardly thereacross in position spaced above the supporting bed beams 2 (see Figs. 2 and 4).

The arched members 6 are mounted and spaced along the supporting bed from the supply end of the machine to the intermediate portion of the bed, and the arched members 7 are spaced along the bed from the intermediate portion to the opposite or discharge end of the machine, the adjacent arched members 6 and 7 at the intermediate portion of the machine being suitably spaced apart (see Figs. 1–1a). Now, referring here to Figs. 2, 4, and 5, the arched portions 6a of members 6 are each flattened at 6b along one side thereof, while the arched portions 7a of members 7, are each flattened at 7b along the opposite side thereof with respect to the flattened portions 6b of members 6 (see Fig. 5). The flattened portions 6b of members 6 are alined longitudinally of the machine and define the path of movement of the stave blanks along one side of the longitudinal center of the machine from the supply end to the intermediate portion, and the alined flattened portions 7b define the path of movement of the blanks along the opposite side of the machine from the intermediate portion to the discharge end.

A stave blank conveyor chain trough or channel 8 is secured across, extending between and along the upper sides of the flattened portions 6b of members 6 and receives slidably therein the upper ply of an endless conveyor chain 10; and a similar trough or channel 9 is secured on and over the flattened portions 7b of members 7, to slidably receive therein the upper ply of the stave blank conveyor chain 11. (See Figs. 2, 4 and 5). The conveyor chain 10 takes stave blanks from the supply end of the machine and carries them along the path defined by flattened portions 6b of members 6 to the intermediate portion of the machine, where a suitable transfer mechanism hereinafter described, moves the blanks laterally across the machine onto conveyor chain 11 at the opposite side of the machine, which chain 11 then conveys the blanks along the path defined by the flattened portions 7b of members 7, to the opposite or discharge end of the machine.

The conveyor chain 10 is operatively mounted over, around and extended between the sprocket 12 mounted at the supply end of the machine and the sprocket 14 mounted at the intermediate portion of the machine, referring now to Figs. 1–1a, and Figs. 8–8a of the drawings in particular. Sprocket 12 is mounted and journaled in vertically disposed, outwardly inclined position alined with trough 8, on a suitable supporting frame 15 secured on and extending upwardly from the bed of the machine (see Figs. 1–1a). Sprocket 14, referring to Figs. 2 and 5, is fixed on a shaft 16, journaled in suitable spaced bearings 16a carried by brackets secured to an adjacent arched member 6, with shaft 16 extending inwardly and upwardly from the outer side of the machine to position the sprocket at the required outward inclination for alinement with trough 8 and the outer or supply end sprocket 12. The chain 10 is driven by rotation of shaft 16 and sprocket 14, to move the upper ply thereof in trough 8, inwardly through the trough from sprocket 12 at the supply end of the chain, to the sprocket 14, as indicated by the arrow showing the direction of rotation of sprocket 12, in Fig. 1a.

Preferably, the lower ply of conveyor chain 10, is housed in and extends slidably through any suitable chain pipe 10a (see Figs. 1–1a) mounted beneath the arched members 6 and extending between the chain sprockets.

The conveyor chain 11 is operatively mounted on and between the sprocket 17 at the discharge end of the machine, and the sprocket 18, at the intermediate portion of the machine, referring to Figs. 1–1a, and Figs. 8–8a. Attention is here directed to the fact that the chains 10 and 11, extend past each other, or in effect overlap, at the intermediate portion of the machine, due to the relative position of the inner sprockets 14 and 18, as will be clear by reference to the drawings, and for a purpose to be explained hereinafter.

The outer or discharge end sprocket 17 is mounted and journaled in vertically disposed position, inclined outwardly in a direction opposite the inclination of sprockets 12 and 14, alined with trough 9, on a suitable supporting frame 19 secured on and extending upwardly from the bed of the machine (see Figs. 1–1a). The sprocket 18, referring to Fig. 5, is fixed on a shaft 20, journaled in suitable bearings 20a carried by brackets secured to an adjacent arched supporting member 6—7, with the shaft 20 extended outwardly and downwardly to the adjacent side of the machine to position sprocket 18 at the required outward inclination for alinement with trough 9 and sprocket 17. The chain 11 is driven by rotation of shaft 20 and sprocket 18, to move the upper ply of the chain outwardly through trough 9, to sprocket 17 at the discharge end of the machine; the direction of rotation of the chain and sprocket 17 being indicated by an arrow in Fig. 1.

As with chain 10, the lower ply of chain 11, is preferably housed and slides through a chain pipe 11a (see Fig. 1) mounted beneath arched members 7 and extending between sprockets 17 and 18, below chain trough 9.

The conveyor chains 10 and 11 are driven through the sprockets 14 and 18, respectively, from the main drive of the machine, which drive in the example hereof, referring now to Figs. 5 and 6 of the drawings, includes the main drive shaft 21, horizontally disposed transversely across the discharge end of the machine and journaled in suitable bearings 21a mounted on the upper side of the supporting bed longitudinal beams 2 (see Figs. 1 and 6). One outer end of the main shaft 21 is extended outwardly a distance beyond beam 2, and carries fixed thereon, in this instance a main drive belt pulley 22, which is operatively coupled with any suitable source of power, such as an electric motor (not shown). On the same side of the machine as drive pulley 22, a stub shaft 23, parallel with drive shaft 21, is journaled in horizontal position in a bearing 23a mounted on the under side of the adjacent longitudinal bed beam 2, and extends outwardly to carry at its outer end a belt pulley 24. On drive shaft 21, a belt pulley 25 is fixed adjacent pulley 22, in line with pulley 24, and a crossed belt 26 operatively connects pulley 25 with pulley 26 to drive shaft 23, as will be clear from Fig. 6. Any suitable or desired spring pressed idler pulley 27 is mounted and supported from adjacent beam 2 in engagement with the under side of the lower ply of belt 26, to function as a belt tightener, as will be readily understood. (See Fig. 1.)

A counter shaft 28, which also forms the main cam shaft for the machine as will be later described, is mounted substantially above and parallel with shaft 23, extending transversely across the machine and journaled in suitable alined bearings 28a secured on the upper sides of the bed longitudinal beam 2, respectively. (See Fig. 5). The shaft 28 is geared to and driven from stub shaft 23 by, in the present instance, the spur gear or pinion 29 fixed on shaft 23 and meshed with the gear 30 fixed on the end of shaft 28 thereabove; the required gear ratio between pinion 29 and gear 30 being of course provided to obtain the desired rate of rotation for the shaft 28.

It is from the counter shaft 28, so driven, that the stave blank conveyor chains 10 and 11 are actuated, both conveyor chains in the instant example being driven at the same rate of speed from this counter shaft 28. For instance, this is accomplished in the machine hereof by providing a bevel pinion 16' on the outer, lower end of sprocket shaft 16, and a bevel pinion 20' on the outer, lower end of the sprocket shaft 20, referring now to Fig. 5 of the drawings, which pinions are operatively meshed, respectively, with the bevel gears 31 and 32 fixed on shaft 28 at opposite sides of the machine adjacent the longitudinal beams 2 of the supporting bed.

In the foregoing manner, by main drive shaft 21, belt 26, shaft 23, through meshed gears 29—30, the counter or main cam shaft 28 of the machine is rotated, and the conveyor chains 10 and 11 are driven to move in the same direction from the supply end toward the discharge end of the machine, through the meshed gears 16'—31, and 20'—32, respectively. Such movement of the conveyor chains carries the stave blanks through the machine for the successive trimming and jointing operations by the mechanisms and means hereinafter described and explained.

At the supply or feed end of the machine, having reference now to Figs. 1–1a and Figs. 8–8a, a magazine or rack for receiving a supply of suitably formed stave blanks B, is provided. In the example hereof, such a stave blank magazine or rack happens to take the form of and include, the vertically disposed wall or plate 33 suitably mounted and fixed in position extending transversely across the conveyor chain 10 and its trough 8, at a position spaced inwardly a distance from the end of the machine slightly greater than the lengths of the stave blanks B; and the outer side vertically disposed, spaced and outwardly inclined posts or rack bars 34 to receive and against which the outer longitudinal edges of the stave blanks B are engaged and vertically alined. The lower edge of the magazine end plate 33 is spaced above and transversely across conveyor chain 10, referring particularly to Fig. 15 of the drawings, at least a distance slightly greater than the stave blank of greatest thickness to be fed therebeneath by the conveyor chain 10.

The stave blanks B are piled or stacked in horizontal, flat position one upon another on the table or platform of which chain trough 8 forms a part, with their forward ends against plate 33 and their outer longitudinal edges against the bars 34. In this stacked position, the lowermost or bottom stave blank B is in position to be fed forwardly by conveyor chain 10, beneath and under the lower edge of plate 33, while the blanks thereabove are held in position against forward movement by the wall. The stave blanks are successively fed, one by one, from the bottom of the stack within the supply magazine or rack, by a series of lugs 35 secured on the chain 10 at suitably spaced intervals therealong. These lugs are of course extended from the outer side of the conveyor chain to a height sufficient to engage the rear end of a stave blank B and push the blank along with the chain. The spacing of lugs 35 is such as to properly time the successive blanks for their arrival to and departure from the several mechanisms which operate upon the blanks as they progress through the machine, as will be readily understood from the descriptions and explanation to follow.

Referring to Fig. 15, of the drawings, an arrangement for preventing the feed by the conveyor chain lugs 35 of more than one of the stave blanks B at a time beneath plate 33, from the stack of blanks, is disclosed. Such an arrangement can embody a dog 36 pivoted to the forward side of plate 33, and having a weighted lever 37 extending forwardly therefrom adjacent the pivotal axis of the dog. The dog 36 normally extends under the action of weighted lever 37, downwardly to and terminates with its free end disposed at the upper portion of the space beneath plate 33, so that, a stave blank of a thickness to engage the dog will swing the dog forwardly and upwardly as such blank is moved forwardly beneath the plate 33 by the chain, but in the event of two relatively thin blanks being together in the supply stack, the dog will retain the upper blank against forward feeding by the lower blank as the latter is fed beneath the plate 33 through positive engagement with a chain lug 35.

Under prevailing stave making practice, the stave blanks B are preliminarily sawed and cut to length and cut to approximate width, on a band saw or other suitable machine, as will be familiar to those skilled in the production of staves. Frequently, at least one longitudinal edge of a blank may be rough, uncut, and/or carry bark, and one of the features of a machine of my invention provides for accurate trimming and cutting of such an uneven, uncut, and/or bark carrying longitudinal edge to bring a blank to a desired and accurate width with evenly cut longitudinal edges, all preparatory to the bilging of such edges by the machine.

In carrying out the automatic trimming of the stave blanks B, in the present machine, a rotary trimming saw 40 is mounted in vertically disposed position adjacent the forward side of the magazine or rack end plate or wall 33, referring to Figs. 1–1a, 2, and 3 in particular, on a shaft 41 disposed transversely of the machine and inclined upwardly from the side of the machine opposite the stave blank path defined by the conveyor chain 10, so as to place the saw 40 at such an angle to a stave blank B being trimmed thereby, that the proper bevel or angle is given the longitudinal edge of the blank, which blank is of course usually transversely curved or arched (see Fig. 3). The saw shaft 41 is journaled in suitable bearings fixed on the machine, and in the example hereof, is provided at its upper end with a drive pulley 42 (see Figs. 2 and 3) for operative connection with any suitable source of power, such as an electric motor (not shown) for rotating the shaft and saw 40. The saw 40 is splined or slidably keyed on shaft 41 for reciprocation or sliding movement back and forth thereon while being operatively rotated thereby, to and from operative trimming position in the path of a stave blank being fed forwardly from the supply of stave blanks B.

The movement of the saw 40 longitudinally of shaft 41 to and from operative stave blank trimming positions is automatic, and its operative position is controlled by and in accordance with the width of each stave blank as fed from the blank supply.

A vertically disposed arm 43 is pivotally mounted, in the present instance, at its lower end on a bracket 43a or other suitable support, carried by the supporting bed of the machine, referring now to Figs. 2 and 3, for swinging laterally of the machine, and the upper or free end of this arm 43 carries a yoke 44 (see Figs. 10 and 11) having the opposite pins 44a which are received in and slidably engage a grooved hub 45, which hub slidably and rotatably mounts the saw 40 on the shaft 41. A coiled spring 46 connected between arm 43 and adjacent fixed structure of the machine, say one of the arched members 6, normally contracts and draws and maintains arm 43 swung outwardly to inoperative position on shaft 41, as shown in Fig. 2. Inward swinging of arm 43, against the tension of spring 46, slides the saw 40 inwardly on shaft 41, to an operative position as shown in Fig. 3.

An automatically actuated lock mechanism for releasably maintaining saw 40 in an operative position during the trimming of a blank by the saw, is provided. Such lock mechanism may embody a vertically disposed lever 47 pivotally mounted at its lower end on the outer side of the arched member 6 adjacent shaft 41, and having fixed therewith and extending from the lower pivoted end thereof, a horizontally disposed, vertically rockable latch member 48. (See Figs. 1 and 10 in particular). A toothed locking rod 49 is pivotally connected at one end to a vertically disposed arm 50 fixed on and extending spaced from one side of the saw actuating yoke 44, and this rod extends horizontally outwardly to, across and loosely rests on the latch member 48. (See Fig. 10). The rod 49 is toothed at 49a on the under side thereof for a distance adjacent its outer end (see Figs. 2 and 3), so that, when the saw 40 is moved inwardly to operative position, the rod 49 is drawn inwardly therewith and the toothed portion 49a engages latch member 48 and the rod holds the saw in position against outward movement on shaft 41, under the action of spring 46. (See Fig. 3). By swinging lever 47 to rock the latch member 48 downwardly, the toothed portion of rod 49 is disengaged from the latch member, and spring 46 thereupon swings lever 43 to slide the saw outwardly to inoperative position.

The trimming saw 40 is automatically positioned for the trimming operation by and in accordance with the width of each particular stave blank B fed thereto, so that, a splint or edge strip of a predetermined maximum width is sawed from each blank. In the example hereof, a stave blank feeler frame for automatic, timed actuation to engage the edge of each stave blank B to be trimmed, is provided. This feeler frame includes the spaced, substantially parallel, vertical arms 51 pivotally mounted at their lower ends for horizontal swinging laterally of the machine, on a fixed shaft or rod 52, which shaft 52 extends longitudinally of the machine substantially from end to end thereof, beneath and centrally of the arched members 6 and 7 adjacent the lower ends thereof (see Figs. 1–1a, and Fig. 6). The feeler frame formed by arms 51, is mounted on shaft 52 at the supply end of the machine below the rack for the stave blanks B, and these arms 51 are extended upwardly and inwardly to provide at their upper ends the spaced feeler members or fingers 53 (see Fig. 1a and Figs. 2 and 3) for engaging with their free end with the inner longitudinal edge of the lowermost stave blank in the supply of blanks B, when the frame is swung upwardly and inwardly from its outwardly swung position of Fig. 2, to its operative stave blank edge engaging position of Fig. 3.

A supplemental saw positioning frame is swung with and by the arms 51, and, referring here to Figs. 2 and 3, includes the vertical members 54 alined transversely of the machine with arms 51, respectively, and connected at and across their upper ends by the angle bar 55 secured thereto. The supplemental frame formed by vertical members 54 and horizontal connecting bar 55, is swingable independently of arms 51, and in order to adjust the position and spacing of bar 55 inwardly from arms 51, adjusting screws 56 are threaded transversely through arms 51 to engage at their inner ends, the bar 55 on arms 54. (See Figs. 1a, 2, and 3).

The bar 55 of the supplemental saw positioning frame, carries a horizontally disposed lever 57 pivotally mounted on the upper side thereof adjacent the saw end of the bar, and this lever is provided with an outwardly projecting finger 58, referring now to Figs. 10, 11, and 14 of the drawings, which finger is disposed across the path of movement of arm 50 of saw yoke 44, in position for engaging the outer side of such arm (see Figs. 10 and 11). The arm 57, with finger 58, is normally swung and maintained in outwardly swung position by the spring 59 connected between the inner end of the arm and the bar 55 (see Fig. 14). The position of the finger 58 is adjustable by swinging arm 57, and an adjusting cam or eccentric 60 is pivotally mounted on the end of arm 57 in edge engagement with bar 55. An operating handle 61 is provided on cam 60 for rotating the same, and a notched quadrant or the like 62 is engaged by handle 61 for releasably securing the handle to hold cam 60 and finger 58 in adjusted position. (See Figs. 11 and 14.) Rotation of cam or eccentric 60 in engagement with bar 55, by handle 61, will swing lever 57 inwardly or outwardly to adjust the position of finger 58 inwardly or outwardly with respect to arm 50 of saw sliding yoke 44.

Thus, with the foregoing arrangement of mechanism, when the feeler frame is swung inwardly from its outward position of Fig. 2, it carries bar 55 of the supplemental frame inwardly with it and the finger 58 thereon strikes and engages arm 50 of yoke 44, and slides the rotating trimming saw 40 inwardly along shaft 41. The inward swinging of the feeler and supplemental frames, and inward movement of saw 40, continues until the feeler fingers 53 strike and engage against the longitudinal edge of the lowermost stave blank B about to be fed from the magazine. Engagement of the feeler fingers 53 arrests continued inward swinging of the frames, and inward sliding of saw 40, and the saw is thus set and positioned the desired distance inwardly from the edge of the stave blank to saw off the edge splint or strip of the predetermined width upon forward feeding of the blank, as will be clear by reference to Fig. 3.

The feeler frame 51—53 and supplemental frame 54—55, are positively, continuously swung inwardly and outwardly at the proper timing, from the main cam shaft 28 of the machine. Referring now to Figs. 1a, 2, 3, and 6, the lower ends of vertical arms 51 are extended outwardly from the opposite side of fixed shaft 52, to form the stub arms 65. A rock shaft 66 is journaled extending transversely through the machine beneath fixed shaft 52 adjacent the inner of the stub shafts 65. (See Figs. 1a and 6.) The stub shafts 65 are pivotally connected at their outer ends to the opposite ends, respectively, of the base of a substantially triangular equalizer frame 67, which depends therefrom and is pivotally connected at its lower central portion to the outer, free end of a horizontally disposed crank arm 68 fixed to and rocked by the shaft 66.

The shaft 66 is extended outwardly from the feeler frame side of the machine, and is provided with a weighted arm 69 fixed thereon so as to rock shaft 66 when free, to normally swing crank 68 upwardly and, through equalizer frame 67, swing the feeler and supplemental frames outwardly to the position of Fig. 2. The extended, outer end of shaft 66 is also provided with an upstanding, vertical crank arm 70 having the outwardly extended, horizontally disposed headed crank pin 71 at its upper end, by which the shaft 66 is rocked from the main counter or cam shaft 28.

The main cam 72 of the machine is mounted on the outer end of the shaft 28 on the same side of the machine as the vertical crank 70 of rock shaft 66, and is the medium from which shaft 66 is rocked to swing the feeler and saw positioning frames inwardly and outwardly. An outwardly extending crank pin 73 is provided on cam 72, and a connecting rod 74 is pivotally mounted at one end thereof on said pin and extends to, and at its opposite end operatively engages and rests upon the upper side of the headed pin 71 of shaft 66—carried crank arm 70. The crank 70 engaging end of rod 74 is, in the specific example hereof, formed with a vertically split or bifurcated open top and bottom head portion 74a, referring now to Fig. 9 in particular, from the upper side of which a reduced depth crank pin 71 engaging slide 74b extends a distance in longitudinal continuation of rod 74. The slide 74b terminates at its outer end in the depending guard lip 74c.

A notched block 75 is rotatably mounted on a horizontal axis disposed transversely of and between the outer ends of head portion 74a of rod 74, and is normally held in position against rotation by the free end of a vertically swingable plate pressed down onto the head 74a into engagement with a flat side of block 75. A coiled expansion spring 77 is mounted in position on head 74a to continuously force the plate 76 downwardly into engagement with block 75. (See Fig. 9.) In operative position rod 74 is supported by slide 74b engaged on and slidably resting upon the upper side of crank pin 71, with the pin 71 engaged at one side in a notch of block 75. When rod 74 is forced rearwardly toward pin 71, the crank 70 is rocked rearwardly thereby to rock shaft 66 and swing the feeler frame 51—53 upwardly into engagement with a stave blank. Upon arrest of swinging of the feeler frame by a stave blank, continued rearward movement of rod 74 by cam 72 causes block 75 to rotate against the spring pressed plate 76 and the head 74a of rod 74 rides up onto and over crank pin 71. On the following forward stroke of rod 74, the slide 74b will again drop onto the pin 71 in position for again swinging crank 70 forwardly; the crank 70 having been returned to forward position under the action of weighted arm 69 after pin 71 is released from engagement with block 75 at the limit of forward swing of the crank 70.

Automatically actuated and controlled means for releasing the saw lock mechanism 48—49 is also provided, and in this instance comprises a pull rod 80 (see Figs. 1–1a, and Fig. 12) pivotally connected to vertical latch 48 swinging lever 47, and extending forwardly to the upper end of a crank 81 upstanding from one end of a horizontal shaft 81a journaled adjacent cam 72, which shaft 81a at its opposite end has a forwardly disposed trip finger 82 extending to the inner side face of cam 72. (See Fig. 12). A spring 83 normally maintains crank 81 and lever 47 in vertical position with latch 48 raised. A lug or pin 82a extends from the inner face of cam 72 in position to engage and force trip finger 82 downwardly to swing lever 47 and lower latch 48, by pulling rod 80.

In operation of the feed and stave blank trimming mechanisms arranged as described above, the stave blank conveyor lugs 35 on chain 10 are so spaced apart, and the position of this chain is so timed with respect to cam 72, that prior to the engagement of a lug 35 with the rear end of the lowermost stave blank of the stack of blanks B in the machine supply magazine, the cam 72 moves the connecting rod rearwardly from the position of Fig. 1. Rearward movement of rod 74 rocks shaft 66 rearwardly and swings the feeler frame 51—53, with the saw positioning frame 54—55 upwardly, sliding saw 40 inwardly therewith along shaft 41, until the feeler fingers 53 engage the edge of lowermost blank B. When the feeler fingers 53 engage the stave blank, swinging of the feeler and saw positioning frames, and inward movement of saw 40 is stopped, and the saw is thus automatically positioned, due to the distance inwardly between the ends of feeler fingers 53 and the plane of saw 40 (see Fig. 3), for sawing off a longitudinal edge strip from the blank when the blank is fed forwardly past saw 40 by chain 10.

With the crank 70 at its limit of rear swing, determined by the width of the particular stave blank engaged, the rod 74 rides up on and over crank pin 71 and releases the crank 70, with the feeler and saw positioning frames controlled thereby, for return to normal position under the action of weighted arm 69. This removes the feeler fingers 53 from engagement with the stave blank and leaves the saw 40 held in operative blank trimming position, by toothed rod 49 in locking engagement with the latch 48, as shown by Fig. 2 of the drawings. After the foregoing operations, the forwardly moving conveyor chain 10 has traveled a distance to bring a lug 35 in engagement with the blank, and then pushes the blank B forwardly beneath magazine end plate 33 and against saw 40, which cuts off a strip or splint S (see Fig. 8) from the blank to trim the longitudinal edge as the blank is forced along past the saw.

As the saw 40 completes its trimming operation, cam 72 has rotated to engage lug 82a with trip finger 82, which, through rod 80, swings latch 48 downwardly out of engagement with toothed rod 49, and the spring 46 (see Fig. 3) then slides the saw 40 outwardly into the position of Fig. 2, ready for repositioning by inward swinging of the frames 51—53 and 54—55 to engage the next stave blank B; the saw 40 being repositioned and adjusted through the feeler fingers 53 to a position for trimming each blank automatically in accordance with its particular width.

In order to maintain the stave blank B being trimmed by saw 40, in position during the sawing operation, a series of spring and/or gravity pressed rollers 85 (see Figs. 1–1a, 2, and 8–8a) are supported from a framework 86 and bear upon and press down on a blank B as it is moved forwardly past the saw by chain 10.

In the example hereof, an arrangement is also provided for assisting in the removal of the edge strip or splint S (see Fig. 8) cut from a blank. This arrangement here takes the form of a horizontal shaft 87 disposed longitudinally of the machine above the position of a stave blank being sawed, and journaled at its opposite ends in suitable bearings carried by the upwardly and transversely extended supporting frames 87a, respectively. (See Figs. 1–1a, and Figs. 8–8a). A series of radial wipers or brushes 88, preferably formed of a suitable flexible material backed by spring blade members, are extended radially from shaft 87 at spaced intervals therealong, and as the shaft 87 is rotated continuously wipe or brush outwardly across and over the stave blank being sawed and splint S cut therefrom, and finally as this splint becomes severed from the blank, sweep or throw it laterally clear of the machine.

The splint wiper or brushing shaft 87, is driven continuously during the operation of the machine from the main cam shaft 28, by a chain 89 extended operatively from such shaft to drive bevel gear 90 in mesh with bevel gear 91 on shaft 87 (see Fig. 1) and rotate the shaft 87 with its wipers or brushes 88.

In accordance with the invention, after each stave is trimmed by saw 40, it next has the proper bilge or longitudinal curvature formed on one longitudinal edge thereof as it is moved forwardly from the sawing operation by chain 10; and then finally has the required bilge or longitudinal curvature formed on the opposite edge from that first bilged, this final bilging being carried on as the stave blank is moved forwardly by conveyor chain 11 to which it has been automatically transferred following the first bilging operation. The bilging operations are performed by separate rotary cutters automatically actuated and controlled to simultaneously bilge the opposite longitudinal edges of separate stave blanks, respectively, as such blanks progress through the machine.

The first rotary cutter 100, which may be of any desired or known type suitable for the work, is mounted in horizontally disposed position on the upper end of a vertically disposed rotary shaft 101, referring now to Figs. 1–1a, 2 and 3, journaled in and extending between suitable bearings on a swinging frame 102. This frame 102 is pivotally mounted at its lower end on the fixed rod or shaft 52 in position extended upwardly and inclined outwardly from one side thereof, and so located as to dispose the cutter head 100 spaced a distance forwardly along the machine from the saw 40 and splint wipers 88 at the outer side of and adjacent conveyor chain 10, with the cutter disposed at a level to engage the outer longitudinal edge of a stave blank B moving tangentially therepast and thereacross (see Fig. 3), when the cutter is swung inwardly by frame 102, to operative stave blank bilging position.

The second rotary cutter 200 for bilging the opposite longitudinal edge of a blank from that bilged by cutter 100, is similar to the rotary cutter 100, and is mounted in horizontally disposed position at the opposite side of the machine from cutter 100, spaced the required distance forwardly along the machine from the first cutter and adjacent the discharge end of the machine, as will be clear by reference to Figs. 1, 6 and 8. Cutter 200 is mounted on the upper end of a vertically disposed shaft 201 (see Figs. 1, 4 and 6) journaled in and extending between suitable bearings on a swinging frame 202, which frame is pivotally mounted at its lower end on the fixed shaft 52 in position extended upwardly and inclined outwardly therefrom to dispose cutter 200 in the required position with respect to and adjacent conveyor chain 11, for cutting the bilge on the edge of a stave blank carrying past the cutter by the chain.

The rotary cutters 100 and 200 are continuously driven and rotated during operation of the machine from the main drive shaft 21. Referring now particularly to Fig. 6 of the drawings, the cutter shaft 101 for cutter 100 is provided with a belt pulley 103 which is operatively coupled with a pulley 104 on drive shaft 21, by a driving belt 105. Preferably, an idler pulley 106 is mounted on the adjacent beam 2, in position beneath and intermediate the lower ply of belt 105 to support and prevent belt sag (see Figs. 1 and 6), and to assist in holding the necessary twisted position of the lower ply of the belt, due to the position of pulley 103 with respect to pulley 104.

The second rotary cutter 200 mounted adjacent the forward or discharge end of the machine, is also driven from main drive shaft 21, but through the medium of a counter shaft 204 disposed transversely of the machine adjacent the cutter 100, and mounted on and across the beams 2, referring here to Fig. 6 of the drawings. A drive pulley 205 is mounted on drive shaft 21 adjacent pulley 25, and a pulley 206 is mounted on the extended end of shaft 204 in line with pulley 205. A belt 207 operatively couples pulleys 205 and 206 for rotating the counter shaft 204 from drive shaft 21. The rotary cutter shaft 201 is provided with a pulley 203 and is operatively coupled with a pulley 208 on countershaft 204, by the belt 209, for rotating the cutter from countershaft 204.

The rotary cutters 100 and 200 are automatically swung or rocked inwardly and outwardly with their pivoted carrying frames, as stave blanks are moved therepast, respectively, so that the cutters will form a bilge of proper curvature on the respective stave edges on which they are working. Such automatic actuation of the rotating cutters is controlled by and from the main cam 72 of the machine in timed relation with the conveyor chains 10 and 11 and the spaced stave blank engaging lugs 35 thereof. A further automatic adjustment of each rotary cutter is controlled by the width of each particular stave blank being bilged thereby, so that, the swinging of the cutter inwardly and outwardly is adjusted to form a bilge of the proper radius of curvature for such width of stave.

The main cam 72 of the machine, as will be clear by reference to Figs. 1 and 8 of the drawings, takes the form in the specific example hereof, of a disk having a circular periphery, but mounted eccentrically on the main shaft 28, so as to alternately present the high side 72a and low side 72b, as the cam is rotated by shaft 28. A rotary cutter actuating rock shaft 108 is mounted extending transversely across the machine, spaced forwardly from shaft 28 and parallel therewith, and is journaled in suitable bearings on the bed frame longitudinal beams 2 (see Figs. 1, 4, and 6). The end of rock shaft 108 at the cam side of the machine, has the upwardly and rearwardly extended rock arm 109 fixed thereto, which arm carries the roller 110 at its upper end resting in operative engagement on the upper side of the peripheral edge of cam 72, so that, rotation of the cam will alternately raise and lower the end of arm 109 and rock shaft 108. Upstanding vertical crank arms 111 and 112, are fixed on the opposite outer ends, respectively, of shaft 108, and these crank arms are operatively coupled with the rotary cutters 100 and 200, respectively, for swinging such cutters inwardly and outwardly.

The arrangement for operatively coupling the cutters 100 and 200 with rock shaft 108 for swinging of the cutters by such shaft, is in the example hereof, substantially identical for each cutter. In the case of cutter 100, an upwardly inclined vertical shaft 114 (see Figs. 2, 3, and 7) is suitably mounted and journaled on the machine adjacent and spaced outwardly from the swinging cutter frame, and carries fixed on its upper end a horizontally disposed arm 115, which is coupled with frame 102 by the rod 116. Rod 116 slidably extends through a fixed member 117, and a coiled expansion spring 118 is mounted around rod 116, between member 117 and arm 115 (see Figs. 2 and 3). The rod 116 is adjustably connected to arm 115, so that, the distance between the arm and frame 102 can be varied and set as may be required. By rocking shaft 114 to swing the rearwardly disposed arm 115 inwardly, rod 116 is actuated to swing frame 102 and cutter 100 inwardly, the spring 118 being compressed. Upon release of the inward rocking force on shaft 114, the expansion of compressed spring 118 assists in returning frame 102 and cutter 100 to normal outwardly swung position.

The lower end of shaft 114, referring to Figs. 3, 6, and 7, carries an outwardly extended forwardly curved or arcuate arm 119, over and on which the end 120 of the pull rod 121, is slidably mounted for movement longitudinally of the arm 119. The opposite end of pull rod 121 is operatively connected by a universal coupling or clevis fitting 122, to the upper end of crank arm 111 on the adjacent end of rock shaft 108. Forward rocking of shaft 108, pulls rod 121 to swing arm 119 forwardly, and rocks shaft 114 to swing arm 115 and rod 116 and rock or swing cutter 100 inwardly.

For swinging cutter 200, a similar arrangement is provided, which includes the vertical and outwardly inclined shaft 214 (see Figs. 4, 6, and 7) mounted adjacent but spaced outwardly and rearwardly with respect to cutter 200, and having the forwardly extended horizontal arm 215 on its upper end which is operatively coupled with cutter swinging frame 202 by rod 216 slidably extending through fixed frame member 217, an expansion spring 218 being mounted on rod 216 between frame member 217 and arm 215. The lower end of vertical shaft 214, carries an outwardly extended rearwardly curved or arcuate arm 219, over and on which the end 220 of the push rod 221 is slidably mounted for movement longitudinally of the arm 219. The opposite end of push rod 221 is operatively connected by a universal coupling or clevis fitting 222, to the upper end of crank arm 112 on the adjacent end of rock shaft 108.

The rotary cutters 100 and 200 are simultaneously swung inwardly and outwardly in timed relation with the respective advancing stave blanks B in operative bilging position with respect thereto, by rotation of cam 72, to cut the respective longitudinal stave blank edges to the required bilge curvature. Referring here to Figs. 1–1a, and 8–8a, as the high side 72a of cam 72 rotates upwardly into engagement with arm 109, such arm is raised or swung upwardly to rock shaft 108 forwardly toward cutter 200. Such rocking of shaft 108, pulls rod 121 forwardly and pushes rod 221 forwardly against curved arms 119 and 219, respectively, and through the foregoing described mechanisms, swings the cutter heads 100 and 200 inwardly to their maximum inward positions, where they are maintained while the high side of the cam is in engagement with arm 109. As the cam 72 rotates further the arm 109 is engaged by the low side 72b of the cam, which swings the arm downwardly and rocks shaft 108 to permit outward swinging of the cutters to form the curved bilge along the longitudinal edges of the blanks from end to end thereof.

As the conveyor chains 10 and 11, while parallel, are out of alinement and carry the stave blanks past cutters 100 and 200 along paths at opposite sides of the machine, respectively, the invention includes and provides an automatically operated transfer mechanism for moving each blank laterally across the machine from chain 10 after bilging of its outer edge by cutter 100, to chain 11 for bilging of the opposite edge of the blank by cutter 200. For example, a vertical, laterally swinging transfer arm 225, referring to Figs. 4, 7, and 8 in particular, is pivotally mounted on the fixed, longitudinal rod or shaft 52 of the machine and extends upwardly therefrom and carries at its upper end the horizontally disposed, inwardly extended fixed jaw 226, and the lower pivotally mounted and vertically swingable jaw 227 therebeneath (see Fig. 4). In normal position transfer arm 225 is swung outwardly toward the chain 10 side of the machine with jaws 226 and 227 separated and disposed forward of the forward, discharge end of chain 10 (see Figs. 4 and 8) and in position to receive a stave blank therebetween from the chain 10. The transfer arm and jaws are then swingable across the machine to carry a stave blank and deposit the same onto chain 11.

The operation of transfer arm and jaws is of course timed with the other mechanisms, and in this instance is controlled from a cam surface 228 on the inner side face of cam 72 adjacent the periphery thereof, which intermittently engages a roller 229 carried at the outer end of an arm 230 fixed on a vertical shaft 231, suitably journaled in a fixed angle member 232 on the machine. The upper end of shaft 231 has fixed thereto a forwardly extended horizontal and jointed arm 233, the outer section of which arm is inwardly swingable, but is held in normal outwardly swung position alined with the inner section by a suitable spring 234 secured between the sections, as will be clear by reference to Figs. 7 and 13, in particular. The pivoted, lower transfer jaw 227, is formed with a depending arm 235, the lower end of which is pivotally connected to the outer end of arm 233, by a rod 236. A coiled contractile spring 237 is secured between the inner end of arm 233 and extends across the machine where it is secured to any suitable fixed point, so that, the spring continuously exerts a force to return arm 233 and the transfer arm 225 with its jaws 226 and 227, to normal position for receiving a blank from chain 10.

The cam surface 228, is so located on cam 72, and is of such dimensions, that at the proper time after chain 10 has fed a stave blank B forwardly between jaws 226 and 227 it engages roller 229, and causes outward swinging of jointed arm 233 to swing the transfer arm 225 with the jaw held stave blank inwardly across the machine to deposit the blank on chain 11. In view of the fact that the stave blanks fed from chain 10 may be of varying widths, and the further fact that each blank is fed over and onto chain 11 against a positioning and guiding wall T'', it is necessary to provide for blanks of maximum width engaging wall T'' in advance of the completion of the full swing of arm 230 and shaft 231. Hence, the arrangement of the jointed section arm 233, which under the referred to conditions, will permit full swing of the inner section of the arm independently of and while the outer section with rod 236 is arrested against further swinging by a wide stave blank engaged with wall T" (see Fig. 8). After transfer of a blank to chain 11 and rotation of cam 72 from engagement with roller 229, the transfer arm and blank receiving jaws swing back to normal position to receive the next blank from chain 10.

By the arrangement which swings transfer arm 225, through pull on lower jaw arm 235, at the start of the transfer operation, the lower jaw 227 is swung up against and grips the under side of the stave blank during the swinging thereof over onto chain 11. This lower jaw is shorter, in the specific example hereof, than the upper fixed jaw 226, and releases the blank when roller 229 reaches the end of cam surface 228 and the return swing of the transfer arm commences.

In accordance with a further feature of the invention, the machine of the instant example provides for automatic variation and adjustment of the swing of each of the cutters 100 and 200, independently of each other, in order to form the bilge curve on the longitudinal edges of a blank to conform to the particular width of such blank on which these cutters are respectively operating. This variation of cutter swing is accomplished by mechanism engaged by the stave blanks as they arrive in operative position with each cutter 100 and 200, to shift rods 121 and 221 on the curved arms 119 and 219, respectively, either inwardly or outwardly to thus increase or decrease the range of cutter swing and resulting curvature given the stave blank edges.

As an example of a possible arrangement for such purpose, in cooperative association with each cutter swinging mechanism, referring now to Figs. 1, 6, 7, and 8 in particular, a laterally swingable horizontally disposed and preferably grooved edge roller 125 is mounted in position opposite cutter 100 for engagement by the edge of a stave blank B as it approaches and reaches position for edge cutting by such cutter; and a similar roller 325 is mounted opposite cutter 200 for engagement by a stave blank as the blank moves to position for cutting by cutter 200. These stave blank engaging rollers are normally maintained at their limit of inward swing in the path of approaching stave blanks, and are engaged by the blanks and swung outwardly a distance in accordance with the width of the blanks with which they are respectively in engagement.

Roller 125 is carried and rotatably mounted, in this instance, on the upturned end 126 of a horizontal arm 127 of a vertical shaft 128, which shaft is suitably journaled in fixed bearings located at the proper position on the machine. A forwardly extended, horizontally disposed arm 129 is carried by the lower end of vertical shaft 128, and has its forward, free end pivotally connected with a push-pull rod 130, which rod is pivotally connected to the cutter swinging rod 121 adjacent the end 120 thereof on curved arm 119. (See Figs. 6 and 7). A coiled contractile spring 131 (see Fig. 7) is connected between a fixed point on the machine opposite roller 126, and the arm 127, which spring normally maintains the roller at maximum inwardly swung position with the end 120 of rod 121 slid to its outermost position on the curved arm 119.

Similar mechanism operatively couples roller 325 with the rod 221 adjacent the end 220 thereof, and includes the vertical shaft 328 having the upper end arm 327 with the upturned end 326 on which roller 325 is rotatably mounted, and the push-pull rod 330 connecting rod 221 with the end of the rearwardly extending, horizontally disposed arm 329 at the lower end of shaft 328. A contractile spring 331 is connected between arm 327 and a fixed point of the machine opposite the arm, so as to continuously exert a force tending to swing the roller inwardly.

With the foregoing arrangements, as the end of a stave blank B reaches cutter 100, it engages roller 125 and will force the roller outwardly a distance in accordance with the width of that particular stave blank. Outward swinging of the roller will slide the end 120 of cutter swinging rod 121, inwardly a distance on curved arm 119, to thus increase the bilge curvature cut on the stave edge by increasing the distance through which the cutter 100 will be swung inwardly and outwardly from end to end of the stave blank during movement of the blank across the cutter. Thus, a bilge curvature proper for each blank width is automatically formed, it being of course understood that the blank being bilged by cutter 100 stays in engagement with roller 125 throughout the cutting operation, so that the adjustment in the cutter swing is set for the operation. After the blank leaves cutter 100, it releases roller 125 which then swings back into position for engagement by the next blank and a readjustment of the cutter swing.

A similar operation and automatic adjustment of the swing of cutter 200 to obtain the proper bilge curvature on a blank B edge operated on by cutter 200, takes place when a blank reaches and engages roller 325. However, as the previously curved and bilged longitudinal edge of each blank formed by cutter 100, is the edge which will be engaged by roller 325, when each of such blanks reaches cutter 200, an allowance in the mounting and adjustment of roller 325 is made to reduce to a negligible minimum, the resulting variation in the mechanism swinging cutter 200 caused by roller 325 engaging and rolling along such a curved edge.

With the foregoing machine of the invention, it is also readily possible to automatically cause the cutters 100 and 200, to form cut-outs or depressions at the desired locations along the bilged edges, simultaneously with the bilging operations, so as to produce staves of the so-called "ventilated" types familiar in the art. Referring here particularly to Figs. 1, 7, and 8, at the proper spaced locations around the periphery of cam 72, radially projecting outwardly curved, convex, portions or projections V are provided for engaging the arm 109, to swing the cutters inwardly over a short period twice during the passage of each blank B past each cutter 100 and 200, so as to cause the cutters to form a notch or cut-out inwardly from the normal bilged edge of the stave adjacent each stave end. (See Fig. 7.) In this manner ventilated staves are automatically produced by the machine through the medium of the bilging cutters, while such cutters are simultaneously performing the bilging operations.

For the purpose of holding and maintaining each stave blank B in position on chain 10 during the operation of cutter 100 on the outer longitudinal edge of a blank, a plurality of spaced rollers 150 are provided which are supported for free rotation from a frame 151, so as to bear upon a stave passing therebeneath. Any one or all of the rollers may be spring pressed and adjustable as to pressure, or these rollers may be of considerable weight and rest by gravity upon a stave blank. Similarly a series of spaced rollers 152 are supported from a framework 153, in position to bear and revolubly rest upon a stave blank operated upon by cutter 200, so as to hold such blank in position against displacement on chain 11, as such chain moves a blank past the cutter. At least one of the rollers 152 may be adjustably spring pressed, while the remainder thereof rest by gravity upon the stave blank.

The conveyor chains 10 and 11 may, for example, be formed as illustrated by a portion of the chain 10 in Fig. 16 of the drawings, with upper side, longitudinally disposed teeth 10' to engage the under side of a stave blank and prevent any slippage laterally of the blank with respect to the chain.

In the operation of the machine embodying the arrangement and association of cooperating structure and mechanisms, carrying out the principles and features of the invention, all as hereinbefore described and explained, the operator places a stack of suitably preliminarily cut and formed stave blanks B in the magazine or rack at the supply end of the machine with their forward ends against plate or end wall 33. The power may then be applied to main drive shaft 21, and the feelers 53 and saw positioning frame will operate to engage the lower blank B and set the saw in position for trimming the inner edge of such blank in accordance with its width, feeler frame and positioning frame then dropping back to normal outwardly swung position. In proper timed sequence a chain lug 35 will next engage the rear end of the lower blank and push the same forward into engagement with and past saw 40 which trims an edge strip or splint S, referring to Figs. 8-8a, therefrom of predetermined width, and at the same time rotating wipers 88 will assist in removing the splint and finally sweep the same from the machine.

At the proper time and on completion of the sawing operation, lug 82a has been rotated by cam 72 into engagement with trip finger 82, and the saw 40 is released and slid to normal outward position on shaft 41 for repositioning for trimming the following stave blank. In the meantime cam 72 has rotated rod 74 to position for the saw adjusting operation in accordance with the width of the next blank, and a chain lug 35 is moving to engage such blank and push it forwardly past the saw for the trimming operation.

The trimmed blank continues to move forward with chain 10 until its forward end reaches cutter adjusting roller 125 and cutter 100, at which time the high portion 72a of cam 72 is still in engagement with arm 109 and the cutter 100 is at its innermost position in the path of and for cutting engagement with the end of the stave blank. As the end of the trimmed stave blank reaches roller 125 and cutter 100 it engages the roller and adjusts the end 120 of rod 121 on curved arm 119 for the proper resulting bilge curvature by swinging of cutter 100. At the same time, the cam 72 is rotating its high side 72a from arm 109, and the low side 72b begins to operatively engage the arm 109, which results in the gradual outward swinging of the cutter 100 followed by its gradual inward swinging as the rear end of the blank approaches the cutter, and as the high side of the cam 72 is again rotated into engagement with arm 109. Thus, the bilge of the proper curvature is cut and formed on the outer longitudinal edge of the stave blank. Shortly after the start of the outward swinging of the cutter by the low side 72b of the cam, a ventilating projection V engages arm 109 to form the ventilating cut-out, and similarly the second projection V actuates the arm just prior to the finish of the bilging operation, so that, ventilating cut-outs are formed adjacent the opposite ends of the stave.

The stave blank after passing cutter 100 now has its outer edge bilged and its inner end trimmed ready for bilging by cutter 200. Chain 10 has moved such blank forwardly from cutter 100, into position between jaws 226 and 227 of the transfer mechanism, and cam 72 is now in position to engage the inner side cam surface 228 with roller 229. As surface 228 rotates in engagement with roller 229, the transfer mechanism swings the blank over onto conveyor chain 11 and a lug 35 of such chain then picks up the blank and moves it on to cutter 200 for bilging of the trimmed side thereof opposite the previously bilged opposite side.

The chain 11 then carries the blank past cutter 200 and cutter adjusting roller 325, and the bilging operation similar to that described for cutter 100 then takes place; the cam 72 being in position as explained for cutter 100. After passing the cutter 200, the stave blank as a jointed and bilged stave is then discharged from the machine.

Following one by one and successively behind the completed stave are the stave blanks from the supply magazine, and these blanks are moved successively past the trimming, splint wiping, first bilging cutter, transfer mechanism, and second bilging cutter mechanisms, to be discharged from the machine as completely accurately jointed and bilged staves. Preferably, the timing of the mechanisms with respect to the spacing between and rate of movement of the stave blanks is such that, stave blanks are in identical positions with respect to the cutters 100 and 200, respectively, at the same time, to take advantage of the simultaneous inward and outward bilge cutting swinging of the rotary cutters.

It is to be clearly understood that the accompanying drawings are more or less diagrammatic and solely for the purpose of illustrating the principles and features of the various means and mechanisms making up a machine, and that proportions, spacings and relative distances in and along the paths of the blanks through the machine are, of course, to be formed and arranged as may be required in practice for proper timing and progress of the blanks through the machine.

It is also evident that various changes, modifications, variations, substitutions, additions, and eliminations might be resorted to without departing from the spirit and scope thereof, and hence it is not my desire or intention to limit my invention in all respects to the exact and specific disclosures hereof.

Desiring to protect my invention in the broadest manner legally possible, what I claim, is:

1. In a stave jointing machine, in combination, means automatically controlled by the varying widths of stave blanks for trimming one longitudinal edge of each blank by a constant predetermined amount, rotary cutter mechanisms for successively bilging the opposite longitudinal edges of a trimmed blank, respectively, and means for progressively and successively moving stave blanks in operative position past said trimming means and rotary cutter mechanisms.

2. In a stave jointing machine, in combination, means automatically controlled by the varying widths of stave blanks for trimming each stave blank by the same predetermined amount, rotary cutter mechanisms for forming a curved bilge on the opposite longitudinal edges of a trimmed blank, and means operatively associated with the cutter mechanisms and controlled by the width of a trimmed blank for automatically actuating the cutter mechanisms to form the opposite edge bilges of a curvature in accordance with the width of the blank.

3. In a stave jointing machine, in combination, means for moving stave blanks longitudinally along a path, separate rotary cutter mechanisms at opposite sides of the stave blank path and spaced apart along the path for successive operative cutting engagement with the opposite longitudinal edges, respectively, of a stave blank as it moves therepast, said cutters laterally swingable toward and from a stave blank to longitudinally curve the edges of the blank, and means controlled by the width of a stave blank for swinging the cutter mechanisms to form a bilge curve on the longitudinal edges in accordance with the width of each blank.

4. In a stave jointing machine, in combination, a conveyor chain for moving stave blanks longitudinally therealong, a cutter mechanism, means for moving the cutter mechanism toward and from the chain to bilge one longitudinal edge of a blank moved therepast by the chain, a second conveyor chain laterally offset from the first conveyor chain for receiving blanks from the latter, a second cutter mechanism, means for moving said second cutter mechanism toward and from said second chain to bilge the opposite edge of a stave blank from that first bilged as the blank is moved therepast, and transfer mechanism automatically actuated to engage each blank at the end of the first conveyor chain and bodily move the same from said first chain onto operative engagement with the second conveyor chain.

5. In a stave jointing machine, in combination, means for moving a stave blank longitudinally along a path, a rotary cutter at one side of the stave path of movement for operatively engaging the edge of a stave as it moves therepast, said rotary cutter laterally swingable toward and from a stave to longitudinally curve the stave edge and form a bilge thereon, and mechanism for laterally swinging said cutter, the means for moving the stave blank directly operated from the cutter swinging mechanism to move a stave blank past the cutter in synchronism with the swinging of the cutter, and means for driving said cutter swinging means.

6. In a stave jointing machine, in combination, means for moving a stave blank longitudinally along a path, a rotary cutter disposed in position at one side of the stave path for operatively engaging a longitudinal edge of a stave blank as the blank moves therepast, said rotary cutter swingable toward and from a stave blank to longitudinally curve the blank edge and form the bilge thereon, means automatically controlled by the width of a stave blank for swinging said cutter to form a bilge curvature in accordance with the width of a blank, means including a driven member for actuating said cutter swinging means and said stave blank moving means driven from and synchronized with the driven member of the actuating means for the cutter swinging means to move a stave blank into timed engagement with the swing of the cutter.

7. In a stave jointing machine, means for moving a stave blank longitudinally along a path, rotary cutters at opposite sides of the path in position for operatively engaging opposite longitudinal edges of a blank, said cutters spaced apart longitudinally of the path a distance such that first one engages the adjacent longitudinal edge of a blank and then the other engages the opposite edge of the blank as the blank is moved along therepast, said cutters laterally swingable toward and from a blank as it moves therepast in operative engagement therewith to longitudinally curve the blank edges and form the bilge thereon, mechanism for swinging said cutters in timed relation with the blank moving means, and means for each cutter automatically controlled by the width of each blank for adjusting the cutter swinging mechanism to swing the cutter to form a bilge curvature in accordance with the width of the blank.

8. In a stave jointing machine, in combination, means for moving a stave blank longitudinally along a path, means for longitudinally trimming a blank, rotary cutters disposed at opposite sides of and spaced longitudinally along the path of movement of a blank for successive cutting engagement with the opposite longitudinal edges respectively, of the blank, each of said rotary cutters swingable laterally of a blank as the blank moves therepast to longitudinally curve the blank edges and form the bilge thereon, mechanism for swinging said cutters, means automatically controlled by the width of each blank for adjusting the swing of the cutters, and a cam actuating the cutter swinging mechanism in timed relation with the blank moving means and blank trimming means.

9. In a stave jointing machine, in combination, means for moving a stave blank longitudinally along laterally offset and successive paths, means for transferring a stave blank from one of said paths to the other, a rotary cutter mounted at one side of one path for cutting engagement with the adjacent longitudinal edge of a blank moving therepast, a second rotary cutter mounted at the opposite side of the other path for cutting engagement with the longitudinal edge of a blank moving therepast opposite the edge cut by the first cutter, said cutters laterally swingable toward and from their respective paths to longitudinally curve and form the bilge on the opposite edges of a blank, mechanism for simultaneously swinging said cutters, said mechanism adjustable to control the swing of each cutter independently of the other, and independent means for each cutter automatically actuated by engagement with the stave blank for adjusting the cutter swinging mechanism to swing such cutter a distance to form a bilge on the blank edge in accordance with the width of the blank.

10. In a stave jointing machine, in combination, a first conveyor chain for moving a stave blank longitudinally along a path, a second conveyor chain laterally offset from said first chain for receiving a stave blank from the first chain and continuing movement of the blank longitudinally along the path defined by said second chain, a laterally swingable stave engaging and transferring member positioned normally at the delivery end of said first chain in position to receive a stave blank therefrom, means for swinging said transfer member toward the second chain to deposit a stave blank in operative position on the second chain and for returning said member to normal position after transfer and deposit of a blank on the second chain, and cutting means operatively positioned with respect to and movable toward and from each chain for forming a bilge on one longitudinal edge of a blank moved therepast, mechanism for moving said cutting means toward and from said conveying chains, respectively, and said means forming the bilge on opposite edges, respectively, of the blank.

11. In a stave jointing machine, in combination, means for moving a stave blank longitudinally along laterally off-set and successive paths, means for transferring a stave blank from one of said paths to the other, a rotary cutter mounted at one side of one path for cutting engagement with the adjacent longitudinal edge of a blank moving therepast, a second rotary cutter mounted at the opposite side of the other path for cutting engagement with the longitudinal edge of a blank moving therepast opposite the edge cut by the first cutter, said cutters laterally swingable toward and from their respective paths to longitudinally curve and form the bilge on the opposite edges of a blank, adjustable mechanism for swinging each cutter, and means for each cutter automatically actuated by engagement with a stave blank for adjusting the cutter swinging mechanism to swing such cutter a distance to form a bilge on the blank edge of a curvature in accordance with the width of the blank.

12. In a stave jointing machine, in combination, means for moving a stave blank longitudinally along a path, a rotary cutter mounted at one side of the path for cutting engagement with the adjacent longitudinal edge of a stave blank moving therepast, a second rotary cutter mounted at the opposite side of the path spaced longitudinally of the path from the first cutter a distance greater than the length of a blank for cutting the adjacent longitudinal edge of a blank moving therepast opposite the edge cut by said first cutter, said cutters laterally swingable toward and from the stave blank path to longitudinally curve and form the bilge on the opposite edges of a blank, adjustable mechanism for swinging the first and second cutters, and independent means for each cutter automatically actuated by engagement with a stave blank for adjusting the cutter swinging mechanism to swing such cutter a distance to form a bilge curvature on the blank edge as the blank moves therepast in accordance with the width of the blank.

13. In a stave jointing machine, in combination, means for moving a stave blank longitudinally along a path, a rotary cutter mounted at one side of the path for cutting engagement with the adjacent longitudinal edge of a stave blank moving therepast, a second rotary cutter mounted at the opposite side of the stave blank path spaced longitudinally therealong from the first cutter a distance greater than the length of a stave blank for cutting the adjacent longitudinal edge of a blank moving therepast opposite the edge of the blank cut by said first cutter, said cutters laterally swingable toward and from the stave blank path to longitudinally curve and form the bilge on the opposite edges of a blank, mechanism operatively coupled with said cutters for simultaneously swinging the cutters toward and from the stave blank path, said mechanism adjustable to control the swing of each cutter independently of the other, and independent means for each cutter automatically actuated by engagement with a stave blank as it moves therepast for adjusting the cutter swinging mechanism to swing such cutter a distance to form a bilge on the blank edge of a curvature to accord with the width of the blank.

14. In a stave jointing machine, in combination, means for moving a stave blank longitudinally along a path, a first rotary cutter mounted at one side of the path for cutting engagement with the adjacent longitudinal edge of a stave blank moving therepast, a second rotary cutter mounted at the opposite side of the stave blank path for cutting engagement with the adjacent edge of a blank moving therepast opposite the edge engaged by said first cutter, said second cutter spaced longitudinally of the path from the first cutter a distance greater than the length of a stave blank to engage the blank after completion of the cutting operation by the first cutter, said rotary cutters swingable laterally of a blank as the blank moves successively therepast to longitudinally curve the blank edges and form the bilge thereon, and means automatically controlled by the width of each blank for varying the arc through which said first and second cutters are swung to form a bilge on the opposite edges of a blank in accordance with the width of the blank.

15. In a stave jointing machine, in combination, means for moving a stave blank longitudinally along a path, a first rotary cutter at one side of the path for cutting engagement with the adjacent longitudinal edge of a stave blank moving therepast, a second rotary cutter mounted at the opposite side of the path from said first cutter for cutting engagement with the adjacent opposite longitudinal edge of the blank moving therepast, said cutters spaced apart along the path a distance such that the second cutter engages a blank after completion of the opposite edge cutting of the blank by the first cutter, said cutters mounted for swinging laterally toward and from the path and blanks moving therealong, mechanism operatively connecting said cutters for simultaneously swinging the cutters toward or from the path, said mechanism independently adjustable for each cutter to vary the swing of the cutters, respectively, independent means for each cutter operatively coupled to said cutter swinging mechanism for adjusting the latter to swing such cutter a predetermined distance, and each of said independent means located for engagement by a stave blank to adjust the swing of its cutter to form a bilge on the edge of the blank of a curvature in accordance with the width of the blank.

16. In a stave jointing machine, in combination, means for moving a stave blank longitudinally along a path, a first rotary cutter at one side of the stave blank path for cutting engagement with the adjacent longitudinal edge of a stave blank moving therepast, a second rotary cutter mounted at the opposite side of the path for cutting engagement with the adjacent edge opposite the edge cut by said first cutter as the blank moves past the second cutter, the said second cutter spaced from the first cutter longitudinally of the path a distance greater than the length of a stave blank, means for swinging said cutters laterally toward and from the path, and means engaged by a stave blank as it passes each cutter for automatically adjusting the swing of each cutter to change the arc through which the cutter is swung so as to cut the edges of the blank to form a bilge curvature in accordance with the width of each blank.

17. In a stave jointing machine, in combination, means for moving a stave blank longitudinally along a path, rotary cutters spaced at opposite sides of said path and spaced longitudinally therealong for successive cutting engagement with the opposite longitudinal edges, respectively, of a stave blank moved therepast by said stave moving means, said cutters each mounted for swinging laterally toward and from a stave blank moving therepast to form a bilge curvature on the stave edges, a rock shaft disposed transversely of the stave blank path between the cutters, links adjustably coupling the ends of said shaft with the laterally swingable cutters, means for rocking the shaft to swing the cutters in synchronization with stave blanks moving therepast, and independent means operatively coupled with said adjustable links to the cutters automatically actuated by engagement with a stave blank for adjusting the swing of the cutters, respectively, to form an edge curvature on each stave blank in accordance with the width of the blank.

18. In a stave jointing machine, in combination, means for moving a stave blank longitudinally along a path, rotary cutters spaced at opposite sides of said path and spaced longitudinally therealong for successive cutting engagement with the opposite longitudinal edges, respectively of a stave blank moved therepast, said cutters each mounted for swinging laterally toward and from a stave blank, as the blank moves therepast to form a bilge curvature on the opposite edges of the stave, a rock shaft disposed transversely of the stave blank path between the cutters, link members adjustably coupling the opposite ends of said shaft with the laterally swingable cutters, respectively, a cam, a rock arm on said shaft in operative engagement with the cam for rocking the shaft from the cam to swing the cutters in synchronization with stave blanks moving along the path past said cutters, and independent means operatively coupled with said adjustable link members, respectively, to the cutters, said independent means each automatically actuated by engagement with a stave blank for adjusting said link members to swing the cutters so as to form an edge curvature on each stave blank in accordance with the width of each blank.

19. In a stave jointing machine, in combination, means for moving a stave blank longitudinally along laterally offset and successive paths, means for transferring a stave blank laterally from one of said paths to the other, a first rotary cutter mounted at one side of one path for cutting engagement with the adjacent longitudinal edge of a blank moving therepast, a second rotary cutter mounted at the opposite side of the other path for cutting engagement with the longitudinal edge of a blank moving therepast opposite the edge cut by the first cutter, said cutters mounted for lateral swinging toward and from their respective stave blank paths to longitudinally curve and form the bilge on the opposite edges of a blank, a rock shaft disposed transversely of said paths between the first and second cutters, link members adjustably coupling said shaft with the laterally swingable cutters, respectively, a cam operatively associated with the rock shaft for rocking the same to swing the cutters in synchronization with stave blanks moving past said cutters, independent means operatively coupled with said adjustable link members, respectively, to the cutters, said independent means each automatically actuated by engagement with a stave blank for adjusting its respective link member to swing the cutter to form a bilge curvature in accordance with the width of each blank, and mechanism operatively connecting said cam with the stave transfer means for actuating the latter to transfer a blank from the first cutter path to the second cutter path.

20. In a stave jointing machine, in combination, means for moving stave blanks longitudinally along a path, means at the supply end of said path engaged by the advancing end of each blank and automatically controlled by the width of each stave blank supplied to said moving means for trimming each blank along one edge thereof by the same predetermined amount, rotary cutters mounted at opposite sides of the stave blank path and spaced apart longitudinally thereof for successively engaging the opposite longitudinal edges, respectively, of a blank moving therepast, and means automatically controlled by the width of each trimmed blank for actuating said cutters to form the opposite edge bilge of a curvature in accordance with the width of each blank.

21. In a stave jointing machine, in combination, means for moving stave blanks longitudinally along a path, means at one side of the path automatically controlled by the width of each stave blank for trimming each blank along the adjacent longitudinal edge of the blank by the same predetermined amount, a rotary cutter at the opposite side of the path from said trimming means and spaced longitudinally along the path therefrom for cutting engagement with the adjacent longitudinal edge of a blank moving therepast, a second rotary cutter mounted at the opposite side of the path from said first cutter and spaced a distance longitudinally along the path from the first cutter for cutting engagement with the adjacent opposite longitudinal edge of the blank, and independent means for each cutter controlled by the width of a stave blank approaching a cutter for automatically actuating each cutter, respectively, to form opposite longitudinal edge bilge on a blank of a curvature in accordance with the width of each blank.

WILLIAM T. SMITH.